May 19, 1931. A. A. STEPHENS 1,805,959
MOTOR PISTON
Filed Dec. 10, 1926
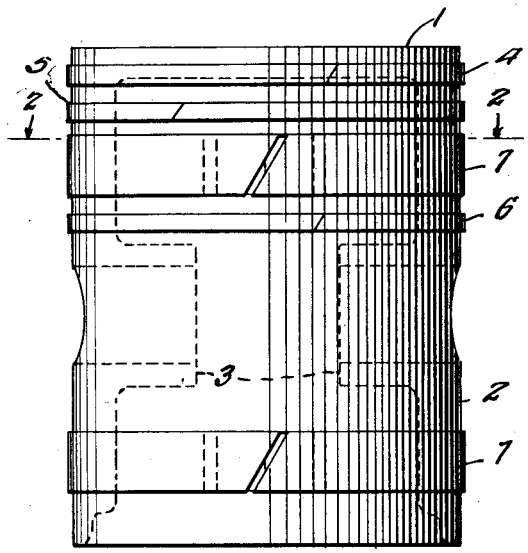
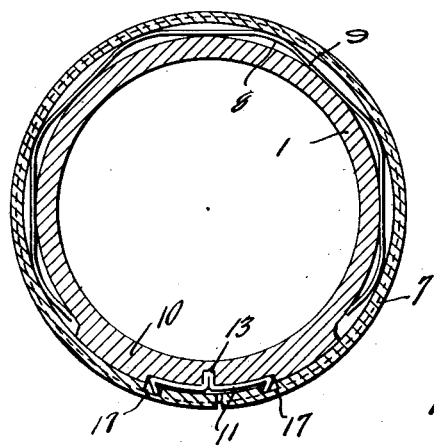
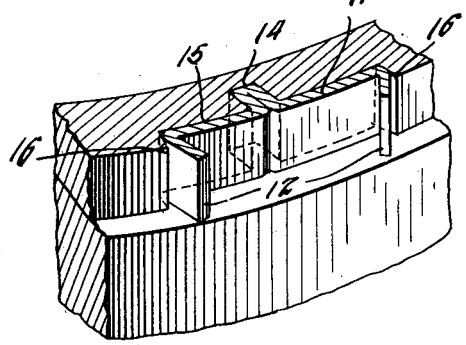
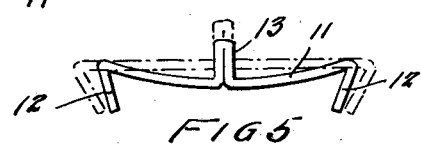
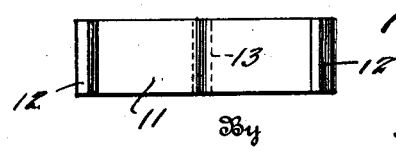
Inventor
ARNOLD A. STEPHENS
By Semmes & Semmes
Attorneys Patented May 19, 1931

1,805,959

UNITED STATES PATENT OFFICE

ARNOLD A. STEPHENS, OF DAVENPORT, IOWA

MOTOR PISTON

Application filed December 10, 1926. Serial No. 153,812.

This invention relates to motor pistons and more particularly to pistons constructed of material having greater thermal expansion and less specific gravity than iron.

Heretofore it has been suggested to replace cast iron pistons of internal combustion engines with pistons composed of aluminum or aluminous and similar alloys. Such pistons have not proved satisfactory, due generally to the fact that an excessive clearance between the bore and aluminum piston had to be allowed. This excessive clearance has resulted in noisy and generally inefficient operation.

It is an object of this invention to provide a piston of light weight with separate expansible sections of a different material and to provide an efficient means to limit the expansion of the section.

Another object is to provide a piston of this character which may be readily assembled.

A further object is to simplify the construction and reduce the cost of such pistons.

Yet another object is to provide a novel restraining means for an expansible section of a piston.

With these and other objects which will appear hereinafter, my invention comprises a piston having a body portion of aluminum, aluminous alloy or similar material which is of less specific gravity than iron, provided with an annular section or sections of a ferruginous or other material which has a coefficient or thermal expansion approximating that of the metal of the cylinder bore.

To make my invention more clearly understood, there is shown in the accompanying drawings a device which embodies its underlying principles. In these drawings the same reference numerals refer to similar parts throughout the several views, of which, Figure 1 is an elevation of a piston taken at right angles to the wrist pin axis;

Fig. 2 is a section on the line 2—2 of Fig. 1;

Fig. 3 is an enlarged detail view of the restraining member and cooperating portions of the piston;

Figs. 4 and 5 are detail views of the restraining member.

In the drawings there is shown a piston having a head portion 1 and an integral cylindrical skirt section 2. Integrally formed with the piston body are wrist pin bosses 3, which are adapted to receive bearing sleeves (not shown). The bosses may be provided with flanges which may extend to and be formed integrally with the contiguous interior wall of the piston. If desired, the upper surface of the bosses may be adapted to present an oil hole in the concavity formed between two adjacent flanges. Any other suitable provisions for lubricating the wrist pin journals may be made.

Seated in grooves in the upper portion of the piston are compression rings 4 and 5 and an oil ring 6. These rings may be of any conventional type. Interposed between the rings 5 and 6 is a separate annular section 7. As shown, this ring section is considerably wider than the compression rings. This ring may be made of cast iron or similar ferruginous material which has a coefficient or thermal expansion approximating that of the metal of the cylinder bore. A second separate section 7 is carried in the groove in the lower portion of the piston. Since these rings are identical in structure, but one will be described, it being understood that what is said of one applies to the other. Certain different functions are served by the two sections, but these differences will be explained hereinafter.

As fully described in my copending application Serial No. 101,949, the piston skirt may be formed with an extending segment on the thrust side, extending for the full length of the skirt. It is to be understood that while I prefer to use such a structure, my present invention is not limited to it. I may utilize a piston which has a skirt portion of uniform radius throughout.

As shown particularly in Fig. 2, the annular section 7 is adapted to seat within a relatively wide groove 8. This groove conforms in its width to the width of the annular member and is of such a depth as to permit a floating movement of the ring in a manner to be more fully described.

Interposed between the ring 7 and the base of the groove is a polygonal ribbon spring 9.

This resilient member extends around the groove for approximately three-fourths of the circumference of the piston. The shape of the spring is such as to provide a series of apices which bear against the interior face of the ring with a substantial radial thrust.

The groove is fitted with a filler block or shim 10. This member is received snugly within the lands of the groove on the thrust side of the piston and is adapted to support and take the thrust imparted by the ring 7. I prefer to make this filler member as a separate piece, to cut down machining costs and to facilitate assembly, but it will be appreciated that if desired I may form it integrally with the piston body.

To prevent unrestricted action of the spring 9, which it is to be understood is quite strong, I provide a restraining means for the annular section. As shown in Fig. 4, this member may be of stamped metal formed from a single blank. As initially formed, the restraining member comprises a body portion 11 and angular integral extensions 12. Intermediate its ends the body or backing portion is bent out to provide a projection 13. The filler block is cut away to form recesses 14 and 15 for the reception of the projections 13 and the body portion 11, respectively. It will be understood that the length of the recess 15 is less than that of the member 11 when the latter is in its expanded position (shown in dotted lines in Fig. 4).

When the piston is to be assembled, the spring 9 is placed in the bottom of the groove 8. The filler block is then inserted. Means may be provided within the groove to prevent circumferential movement of the block, such as projections on the base of the block which register with corresponding depressions in the groove bottom. The restraining member 11 is then sprung, to the position shown in full lines in Fig. 4, and inserted into the filler block. The then tensioned restraining means will be retained in the recess in the filler block by reason of the pressure exerted by the arms 12 against the sides of the recess. If desired, the arms 12 may be notched to receive a small projection which may be formed on the outer edge of the shoulder 16 of the filler block. In practice, however, the force exerted by the tensioned restraining means is sufficient to maintain it in its position within the block.

When the restraining means are placed in position, the rings 7 may be slipped over the piston and inserted into the grooves. The ring is then compressed so that the cut out portions 17 on the interior face of the ring will be engaged by the projections 12. It will be noted on reference to Fig. 4 that when the restraining member is in its operative position, shown in full lines, the arms 12 are angularly disposed with respect to the ring, so that the arms 12 present in effect undercut sections for engaging the sides of the grooves 17.

The operation of the piston will be apparent from the foregoing description. When the piston is inserted in the cylinder the rings 7 bear against the cylinder wall but the aluminum body portion, being of reduced diameter, does not contact with the bore. As the piston is run in, a smooth surface will be worn on the rings and a small clearance between the bore and the rings will be secured. Since the piston body is held firmly against the filler block by the spring 9, lateral movement of the piston with respect to the ring will be minimized. The provision of the compressible sections 7 prevents scoring of the cylinder wall even under abnormal jacket temperatures. If pressure is exerted on the exterior surface of the rings sufficient to overcome the tension of the springs, the rings will slide on the members 12, the adjacent ends approaching each other so that the entire ring is in effect compressed. The restraining means not only limits the expansion of the ring but serves in addition to transmit the thrust delivered to the ring to the piston body through the filler block 10.

As has been intimated, the shape of the members 12 is such that they operate as though undercut. This structure insures a firm engagement of the ring by the restraining means and resists the tendency of the ring to move outwardly of the piston. This tendency is further restricted by the cooperative action of the spring and filler block which conjointly serve to maintain the ring in circular form. The provision of separate sections 7 above and below the wrist pin presents many advantages. It minimizes the tendency of the piston to oscillate about the wrist pin axis as well as the tendency of the piston to move laterally. In addition to this, the lower ring presents a wipe edge which forces oil down into the crank case and thus greatly aids in proper lubrication. The upper ring besides serving the function of a bearing member, aids greatly in the dissipation of heat from the cylinder head by presenting a metallic path from the head to the skirt through the filler block 10.

By constructing the restraining means of a metal stamping, I am enabled to greatly reduce the cost of the device and to insure requisite strength. The simplicity of the restraining means and the other elements of the piston facilitates original installation and subsequent replacement of parts. It will be understood that other specific designs of restraining means may be employed which include the main features of the one shown, such as a single member having oppositely projecting portions to engage the ring and filler block; hence I do not wish to be restricted to the one shown except in so far as such limitations are reasonably imposed by the appended claims.

I claim:

1. In combination with an engine cylinder a piston comprising a head and skirt of a material having a specific gravity less than iron, separate annular radially expansible sections of a ferruginous material carried by the head and skirt and means detachably mounted on the piston to restrain the expansion of the sections while permitting substantially free thermal expansion and contraction of the piston body.

2. In combination with an engine cylinder a piston comprising a head provided with compression rings, separate annular radially expansible sections of a greater width than said rings carried by the piston, and means detachably mounted on the piston to restrain the expansion of said sections while permitting substantially free thermal expansion and contraction of the piston body.

3. In combination with an engine cylinder a piston comprising a head and cylindrical skirt of a like metal, compression rings carried by the head, separate detachable expansible sections of a different material mounted in the head and skirt and means detachably secured to the piston to check the expansion of the sections while permitting substantially free thermal expansion and contraction of the piston body.

4. A piston comprising a head and skirt of an aluminous material, separate annular expansible sections mounted in grooves in the head and skirt, filler blocks interposed between the rings and grooves and means engaging the blocks and sections to restrain expansion of the latter.

5. A piston comprising a body portion of an aluminous material, a separate annular expansible section mounted in the piston and means to limit the expansion of the section comprising a single flexible piece of metal having spaced angularly projecting arms for engaging the section to limit its expansion and a second oppositely extending projection for connection with the piston body.

6. A restraining means of the character described comprising a flexible plate having oppositely projecting central and end extensions.

7. A restraining means for a bearing ring comprising a plate of resilient material formed with projections for engaging the ring and a piston and adapted to prevent relative circumferential movement thereof.

8. A restraining means for a bearing ring comprising a plate having a central stud and terminal converging extensions.

9. A friction locked restraining means for a piston bearing ring comprising a resilient body portion and projections thereon adapted to engage the ring.

10. In combination with a piston and a bearing ring, a restraining means for the ring comprising an inherently resilient plate having integral extensions for engaging the piston and ring, the extension engaging the piston being maintained in position by compressive contact.

11. A piston comprising a head and skirt of a material having a specific gravity less than iron, separate annular sections of a ferruginous material in the head and skirt, resilient members interposed between the piston body and the sections adapted to circumferentially expand the sections and means detachably mounted on the piston to limit the action of the resilient members.

12. A piston having a head and skirt of a material having a specific gravity less than iron, separate ring sections in the head and skirt, means to force the ring sections radially outward from the piston and means to limit the radial movement of the rings comprising a spring member having portions engaging the piston body and adapted to be locked thereto under spring pressure.

13. A piston having a head and skirt of a material having a specific gravity less than iron, separate annular sections of a different material encircling the head and skirt, means engaging only a portion of the sections to force them outwardly of the piston and resilient means engaging the sections to limit their outward movement.

14. A piston comprising a head portion provided with piston rings, a skirt portion, a split expanding bearing ring mounted in said skirt portion and a single means fixed to the skirt and slidably engaging the ring to limit the expansion thereof.

15. A piston comprising a head portion, a skirt portion, a bearing ring carried by the skirt portion and means coacting with the skirt to limit the expansion of the ring and to prevent movement radially inwardly of the ring at one side of the piston.

16. The combination with a piston body provided with the usual piston rings, and fitted with annular auxiliary sections capable of expansion independently of said body, one of said sections being carried by the piston skirt of means for spacing the sections from the piston, of means carried by said skirt for limiting the expansion of said section carried thereby.

17. The combination with a piston head and skirt of one or more annular sections for the body of said piston capable of expansion independently thereof, one of said sections being fitted in said skirt, means for limiting the expansion of said auxiliary section carried by said skirt comprising a curved plate fixed to the skirt and having projections slidably engaging the section and spacing means carried by the piston adapted to transmit the thrust from the piston to the section and to space the section from the piston.

18. The combination with a piston head provided with the usual piston rings of a skirt provided with an auxiliary section of relatively greater width than that of said piston rings, capable of radial expansion and contraction independently of said skirt, means carried by the skirt for limiting the expansion of said auxiliary section, and means for holding said auxiliary section yieldably in expanded position.

19. A piston comprising a head portion, a skirt portion formed with a circumferential groove, expansible bearing rings carried by the body of said piston, one of which is seated in the groove in said skirt, resilient means interposed between the groove and ring, and means positioned between and coacting with the skirt and ring to limit the expansion of the latter.

20. A piston comprising a body portion provided with the usual piston rings, one or more auxiliary sections capable of expansion and contraction independently of the body portion, at least one of said sections being mounted adjacent the open end of the piston skirt, means affixed to the skirt to slidably engage the section mounted therein to limit the expansion of said section, and resilient means interposed between the section and skirt to hold the section yieldably in expanded position.

21. A piston comprising a head provided with compression rings, separate annular expansible sections carried by the piston means on the thrust side of the piston to space the sections from the piston and means detachably mounted on the thrust side of the piston to restrain the expansion of the sections and to directly transmit the thrust of the piston to the sections.

22. A piston comprising a head and skirt of a material having a specific gravity less than iron, separate expansible sections of a ferruginous material mounted on the piston, a spacing element on the thrust side of the piston adapted to space the expansible sections from the piston and a detachable member mounted on the thrust side of the piston cooperating directly with the piston and sections to limit their expansion.

23. A piston comprising a head and continuous skirt of aluminous material, separate annular expansible sections of a material of a different thermal expansion than aluminum, and means mounted on the thrust side of the piston and engaging the piston body and sections to restrain their expansion.

24. A piston having head and skirt portions, a plurality of compression rings and an oil ring carried by the head, positively expanded split bearing rings of greater width than the compression rings mounted in the head and skirt and provided with means to limit their expansion.

25. A piston having head and skirt portions, an expansible bearing ring and compression rings mounted in the head, a positively expanded split bearing ring in the skirt, the bearing ring being provided with means to limit its expansion.

26. A piston having a head and skirt, a plurality of compression rings and an oil ring carried by the head, a positively expanded bearing ring interposed between the compression and oil rings, a positively expanded bearing ring carried by the skirt, the bearing rings being provided with means to limit their expansion.

27. A piston having a head and skirt, a plurality of compression rings and an oil ring carried in grooves in the head, split bearing rings of greater width than the compression rings supported in grooves, one of which is positioned above the oil ring groove, resilient members interposed between the bearing rings and the bottom of their cooperating grooves, and means to limit the expansion of the bearing rings.

28. A piston having a head and skirt, a plurality of compression rings and an oil ring carried in grooves in the head, a split bearing ring of greater width than the compression rings supported in a groove positioned above the oil groove, a resilient member interposed between the bearing ring and the bottom of its cooperating groove, and means coacting with the bearing ring adjacent the split thereof to limit the expansion of said bearing ring.

29. A piston comprising a head and skirt of an aluminous material and provided with circumferential grooves, separate annular expansible sections mounted in said grooves, spacing means in said grooves engaging said sections, and devices engaging said means and sections to restrain expansion of the latter.

30. A piston comprising a head formed with a groove and a skirt, an annular section carried in the groove, resilient means interposed between the piston body and section adapted to force the section outwardly of the piston, a filler member in the groove against which a portion of the section bears, means to limit the outward movement of the section comprising a base plate nested in the filler member having extensions for engaging the section.

In testimony whereof I affix my signature.

ARNOLD A. STEPHENS.